(12) United States Patent
Kim et al.

(10) Patent No.: US 8,917,260 B2
(45) Date of Patent: Dec. 23, 2014

(54) OPTICAL TOUCH PANELS AND METHODS OF DRIVING THE SAME

(75) Inventors: Sun-il Kim, Osan-si (KR); Chang-jung Kim, Yongin-si (KR); Sang-hun Jeon, Yongin-si (KR); I-hun Song, Seongnam-si (KR); Jae-chul Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 652 days.

(21) Appl. No.: 12/805,722

(22) Filed: Aug. 17, 2010

(65) Prior Publication Data

US 2011/0141060 A1 Jun. 16, 2011

(30) Foreign Application Priority Data

Dec. 10, 2009 (KR) .................. 10-2009-0122539

(51) Int. Cl.
*G06F 3/042* (2006.01)
*G06F 3/041* (2006.01)
*G06F 3/038* (2013.01)

(52) U.S. Cl.
CPC ............ *G06F 3/0412* (2013.01); *G06F 3/0386* (2013.01)
USPC .......................................... 345/175; 345/173

(58) Field of Classification Search
USPC ....................................................... 455/175
See application file for complete search history.

(56) References Cited

U.S. PATENT DOCUMENTS

| 5,103,085 | A | * | 4/1992 | Zimmerman | .................. | 250/221 |
|---|---|---|---|---|---|---|
| 5,838,308 | A | * | 11/1998 | Knapp et al. | .................. | 345/173 |
| 5,926,168 | A | * | 7/1999 | Fan | ................. | 345/158 |
| 7,113,174 | B1 | * | 9/2006 | Takekawa et al. | ............ | 345/173 |
| 7,166,966 | B2 | * | 1/2007 | Naugler et al. | ............... | 315/149 |
| 2006/0231882 | A1 | * | 10/2006 | Kim et al. | ...................... | 257/310 |
| 2006/0244693 | A1 | * | 11/2006 | Yamaguchi et al. | ............ | 345/76 |
| 2006/0262055 | A1 | * | 11/2006 | Takahara | ........................ | 345/81 |
| 2007/0216637 | A1 | * | 9/2007 | Ito | .................. | 345/102 |
| 2007/0272922 | A1 | * | 11/2007 | Kim et al. | ....................... | 257/43 |
| 2008/0030360 | A1 | * | 2/2008 | Griffin | ......................... | 340/689 |
| 2008/0066972 | A1 | * | 3/2008 | Abileah et al. | ............. | 178/18.09 |
| 2008/0074401 | A1 | * | 3/2008 | Chung et al. | .................. | 345/175 |
| 2008/0122803 | A1 | * | 5/2008 | Izadi et al. | .................... | 345/175 |
| 2008/0168403 | A1 | * | 7/2008 | Westerman et al. | .......... | 715/863 |

(Continued)

FOREIGN PATENT DOCUMENTS

JP 10-187340 7/1998
KR 1996-0033154 A 9/1996

(Continued)

*Primary Examiner* — Kent Chang
*Assistant Examiner* — Benjamin Morales Fernandez
(74) *Attorney, Agent, or Firm* — Harness, Dickey & Pierce, PLC (57) ABSTRACT

An optical touch panel may include a plurality of light-sensing areas. The plurality of light-sensing areas may be integrally formed with pixels in a display panel or may be formed on the display panel, in order to sense incident light from outside the optical touch panel. A method of driving an optical touch panel may include sensing a change in an output from a plurality of light-sensing areas between two time points and determining that there is an optical input when the change in the output is greater than or equal to a first reference value that is defined in advance. The light-sensing areas may be integrally formed with pixels in a display panel or formed on a surface of the display panel, for sensing incident light from outside the optical touch panel.

19 Claims, 9 Drawing Sheets

(56) References Cited

U.S. PATENT DOCUMENTS

| | | | |
|---|---|---|---|
| 2008/0170086 A1* | 7/2008 | Hatani et al. | 345/690 |
| 2009/0128508 A1* | 5/2009 | Sohn et al. | 345/173 |
| 2009/0161051 A1* | 6/2009 | Fukunaga et al. | 349/115 |
| 2010/0020044 A1* | 1/2010 | Abileah et al. | 345/175 |
| 2010/0060611 A1* | 3/2010 | Nie | 345/175 |
| 2010/0079501 A1* | 4/2010 | Ikeda et al. | 345/661 |
| 2010/0090996 A1* | 4/2010 | Chou et al. | 345/207 |
| 2010/0315377 A1* | 12/2010 | Chang et al. | 345/175 |

FOREIGN PATENT DOCUMENTS

| | | |
|---|---|---|
| KR | 1998-049115 U | 10/1998 |
| KR | 10-2000-0039831 | 7/2000 |
| KR | 10-2001-0001005 | 1/2001 |
| KR | 10-0501379 | 7/2005 |
| KR | 10-2007-0003099 | 1/2007 |

* cited by examiner

OPTICAL TOUCH PANELS AND METHODS OF DRIVING THE SAME

CROSS-REFERENCE TO RELATED APPLICATION(S)

This application claims priority from Korean Patent Application No. 10-2009-0122539, filed on Dec. 10, 2009, in the Korean Intellectual Property Office (KIPO), the entire contents of which are incorporated herein by reference.

BACKGROUND

1. Field

Example embodiments relate to optical touch panels and/or methods of driving the same. Also, example embodiments relate to optical touch panels using light-sensitive transparent oxide transistors and/or methods of driving the optical touch panels.

2. Description of the Related Art

Touch panels may be widely distributed as one of the basic input devices in a computer system, along with keyboards and/or mice. In general, touch panels may be input devices on which a pressure-sensitive film may be attached for inputting signals by touching characters and/or figures displayed on the touch panels with a finger and/or a pen. Since touch panels may not require a keyboard and/or may be easy to manipulate, touch panels may be widely used in automatic teller machines (ATMs) and/or information systems in public places. Recently, touch panels may be realized in various types as touch panel technology has developed, and accordingly, may be widely distributed at a low cost.

However, current touch panels may be directly touched with a hand and/or a pen. Such touch panels may have an excellent sensing efficiency, but a user should be close to the touch panels. Therefore, these touch panels may be used in desktop computers, notebook computers, and/or small display apparatuses such as portable devices, for example, mobile phones and/or navigation devices. However, as the display becomes larger, it may be difficult to apply the touch panel due to a distance between the user and the display device. In addition, according to conventional touch panels, a surface of the display device may be damaged as the number of touching operations increases and, thus, the quality of the image displayed on the display device may be degraded.

SUMMARY

Example embodiments may provide optical touch panels using light-sensitive transparent oxide transistors that may prevent surfaces of displays from being damaged and/or may control a large size display that may be difficult for a user to directly touch.

Example embodiments may provide methods of driving the optical touch panels.

Additional aspects may be set forth in part in the description which follows and, in part, may be apparent from the description, and/or may be learned by practice of the example embodiments.

According to example embodiments, an optical touch panel may include a plurality of light-sensing areas that may be integrally formed with pixels in a display panel and/or formed on the display panel, in order to sense incident light from outside.

A plurality of pixels for forming images and/or the plurality of light-sensing areas disposed on sides of the plurality of pixels at a same layer as that of the pixels may be disposed in the display panel.

A red sub-pixel, a green sub-pixel, and/or a blue sub-pixel adapted to emit red, green, and/or blue lights may be disposed in one pixel area with the light-sensing area.

The light-sensing areas may be integrally fabricated with the display panel on surfaces of the display panel, or may be fabricated separately from the display panel and/or attached on surfaces of the display panel.

The plurality of light-sensing areas may be disposed only on part of the display panel.

Light-sensitive transparent oxide transistors may be used as light sensors in the light-sensing areas.

The light-sensitive transparent oxide transistors may include a gate electrode formed on a substrate; a gate insulating layer covering the substrate and/or the gate electrode, a light-sensitive transparent oxide semiconductor layer partially covering the gate insulating layer, and/or a source electrode and/or a drain electrode on opposite sides of the light-sensitive transparent oxide semiconductor layer.

The light-sensitive transparent oxide semiconductor layer may use a ZnO-based oxide semiconductor and/or an oxide semiconductor in which one or more of indium (In), gallium (Ga), and/or hafnium (Hf) is mixed in the ZnO.

The optical touch panel may further include an image sensor controller adapted to read signals from the light-sensing areas, a row decoder adapted to provide the light-sensing areas with reading control signals according to control of the image sensor controller, and/or an analog/digital (A/D) converter adapted to receive a light intensity signal from the light-sensing areas and/or adapted to convert the light intensity signal to a digital signal.

The A/D converter may include a correlated double sampling (CDS) circuit for removing noise included in the signals from the light-sensing areas.

The image sensor controller may sense a change in the output from the light-sensing area between two time points, and/or may determine that there is an optical input to the optical touch panel when the change in the output according to time may be equal to or greater than a first reference value that may be defined in advance.

The image sensor controller may compare predicted light intensity information of the image displayed on at least one pixel around the light-sensing area with the actually measured light intensity information measured in the light-sensing area, and/or may determine that there is an optical input to the optical touch panel when the actually measured light intensity may be greater than the predicted light intensity by a second reference value that may be defined in advance.

The predicted light intensity information of the image displayed on at least one pixel around the light-sensing area may be provided from a display controller that controls the display panel.

The image sensor controller may determine that there is an optical input to the optical touch panel when the change in the output according to time may be equal to or greater than the first reference value that may be defined in advance and/or the actually measured light intensity may be greater than the predicted light intensity by the second reference value that is defined in advance.

The image sensor controller may generate a selection signal when the optical input may be maintained in a certain light-sensing area for a reference time (that may or may not be predetermined).

The image sensor controller may generate a selection signal when the measured light intensity after the optical input may be generated may be changed in a certain reference range.

The image sensor controller may sense variation in location of the light-sensing area in which the optical input may be incident, and may generate a selection signal when the location of the light-sensing area may be changed in a pattern (that may or may not be predetermined).

The image sensor controller may include a control unit adapted to calculate location information of the plurality of light-sensing areas and/or intensity information in the light-sensing areas, a time variation determiner adapted to determine whether the change in an output from the light sensing areas according to time may be equal to or greater than a first reference value, an input/output variation determiner adapted to determine whether light intensity actually measured in the light-sensing area may be greater than the predicted light intensity by the second reference value, a logic sum circuit adapted to calculate a logic sum of the output from the time variation determiner and the output from the input/output variation determiner, and/or a weight logic circuit adapted to count a time of maintaining the optical input to the optical touch panel.

According to example embodiments, a method of driving an optical touch panel may include sensing a change in an output from a plurality of light-sensing areas that may be integrally formed with pixels in a display panel and/or formed on surfaces of the display panel for sensing incident light from outside the optical touch panel, between two time points, and/or determining that there is an optical input when the change in the output may be equal to or greater than a first reference value that may be defined in advance.

According to example embodiments, an optical touch panel may include a plurality of light-sensing areas. The plurality of light-sensing areas may be integrally formed with pixels in a display panel or may be formed on the display panel, in order to sense incident light from outside the optical touch panel.

According to example embodiments, a method of driving an optical touch panel may include sensing a change in an output from a plurality of light-sensing areas between two time points and determining that there is an optical input when the change in the output is greater than or equal to a first reference value that is defined in advance. The light-sensing areas may be integrally formed with pixels in a display panel or formed on a surface of the display panel, for sensing incident light from outside the optical touch panel.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
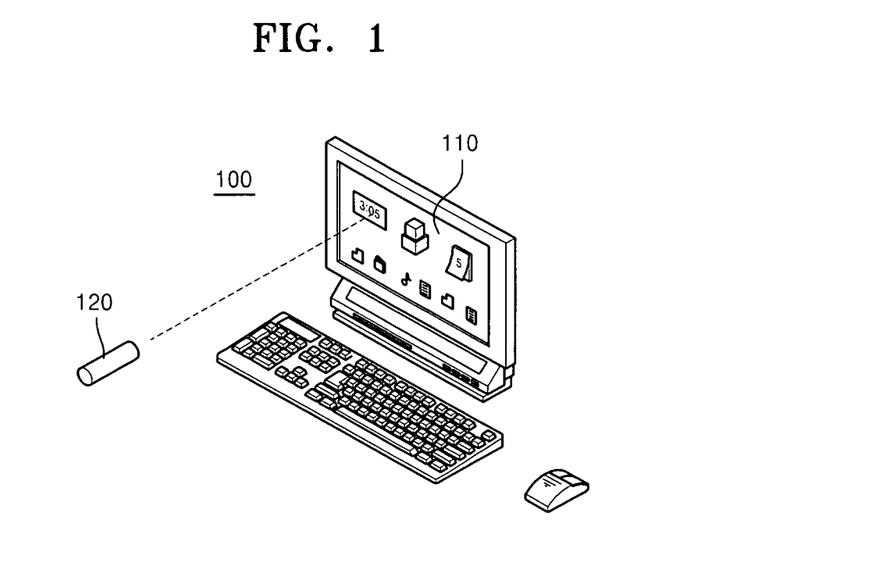
FIG. 1 is a schematic diagram of controlling a display apparatus including an optical touch panel by using a light source device.

FIG. 1 is a schematic diagram showing an example of remote controlling display apparatus 110 including an optical touch panel using light source device 120. Referring to FIG. 1, in computer system 100, which includes display apparatus 110 adopting the optical touch panel, when light is irradiated to display apparatus 110 using light source device 120, such as a laser device, the same effect as that when the touch screen is touched with the hands and/or a pen may be obtained.

Figure 2A:
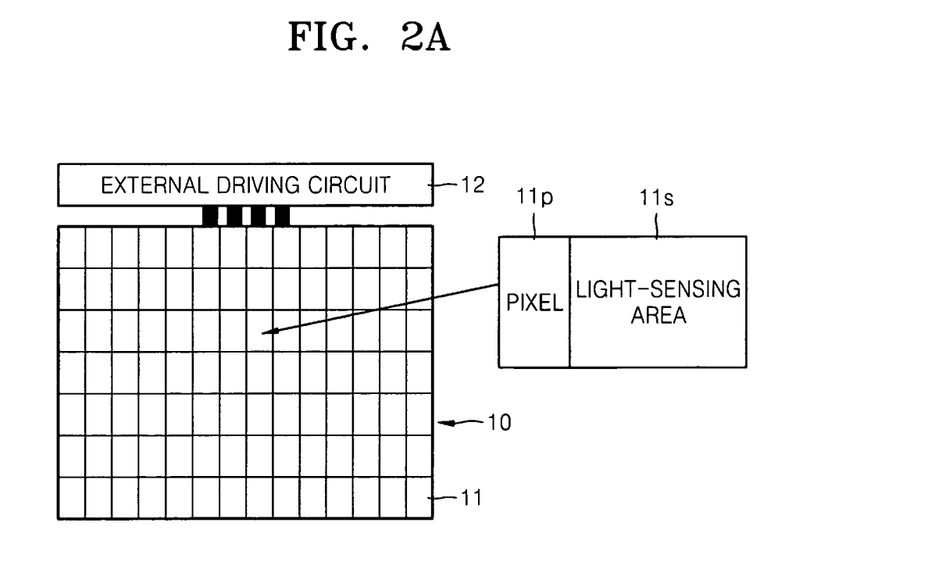
FIGS. 2A through 2C are schematic diagrams showing an optical touch panel in which a light sensing region is integrally formed in a pixel area of a display panel, according to example embodiments.
Figure 2B:
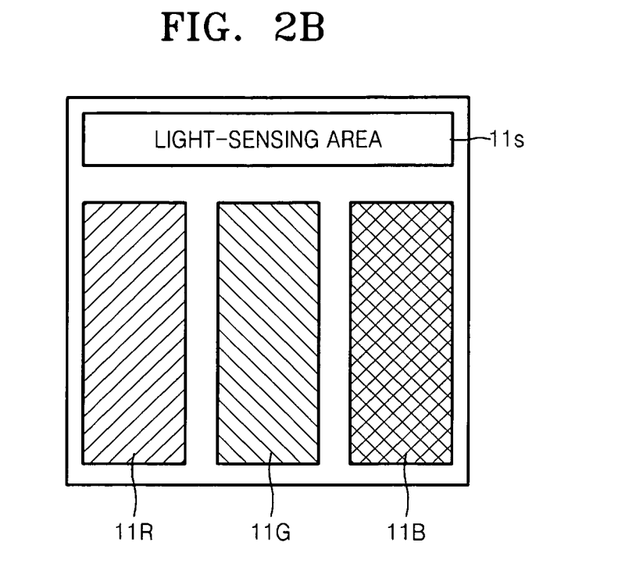
Figure 2C:
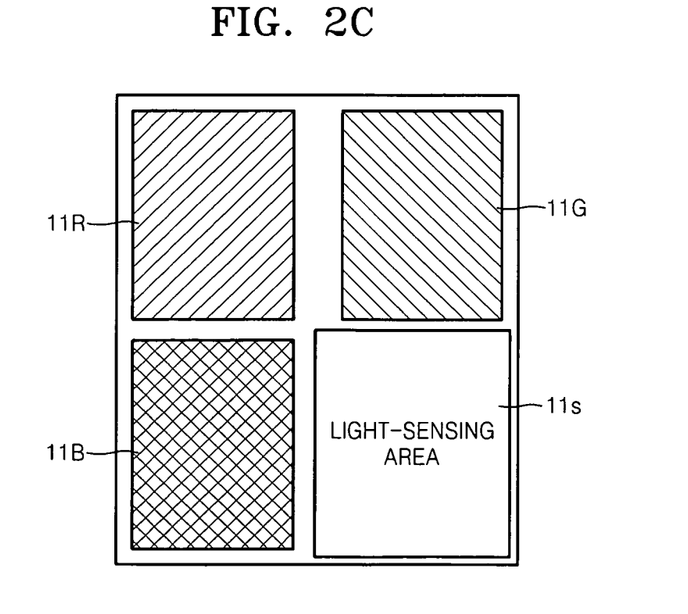

FIGS. 2A through 2C are schematic diagrams showing examples of the optical touch panel, in which a light-sensing area may be integrally formed in a pixel area of display panel 10. Referring to FIG. 2A, the optical touch panel may include display panel 10, including pixel array 11, in which a plurality of pixels may be arranged, and external driving circuit 12 for driving pixel array 11. Display panel 10 may be any kind of display panel, for example, a liquid crystal display (LCD), a plasma display panel (PDP), an organic light emitting diode (OLED) display, and/or a field effect display (FED). As shown in the enlarged portion on a right side of FIG. 2A, pixel array 11 may include a plurality of pixels 11p for forming images and a plurality of light-sensing areas 11s disposed on a side of pixels 11p for sensing incident light. Pixels 11p and/or light-sensing areas 11s may be integrally formed when display panel 10 is manufactured. Pixels 11p and/or light-sensing areas 11s may match each other in one-to-one correspondence. However, example embodiments are not limited thereto, and one light-sensing area 11s may be disposed, for example, at every two or more pixels 11p according to selection by a designer.

In more detail, referring to FIGS. 2B and 2C, in one pixel area, red sub-pixel 11R, green sub-pixel 11G, and/or blue sub-pixel 11B adapted to emit red, green, and/or blue light, respectively, may be disposed. Light-sensing area 11s may be disposed together with sub-pixels 11R, 11G, and/or 11B. Red sub-pixel 11R, green sub-pixel 11G, and/or blue sub-pixel 11B may form one pixel 11p. As shown in FIG. 2B, sub-pixels 11R, 11G, and/or 11B may be arranged in parallel, and/or one light-sensing area 11s may be disposed perpendicularly above sub-pixels 11R, 11G, and/or 11B. As shown in FIG. 2C, one pixel area may be divided into four sub-areas. Sub-pixels 11R, 11G, and/or 11B and/or light-sensing area 11s may be disposed respectively in the sub-areas. The arrangement may vary according to example embodiments.

In the above-described structures, light-sensing area 11s may be located at the same layer as pixel 11p. A thin-film transistor (TFT) layer (not shown) adapted to control pixels 11p may be disposed under pixels 11p. A TFT layer (not shown) adapted to read signals from light-sensing area 11s may be disposed at the same layer as the TFT layer for controlling pixels 11p. For example, the TFT layer for controlling pixels 11p and the TFT layer for reading the signals from light-sensing area 11s may be disposed together on a substrate (not shown) of display panel 10, and pixels 11p and/or light-sensing area 11s may be disposed on the TFT layers.

Figure 3A:
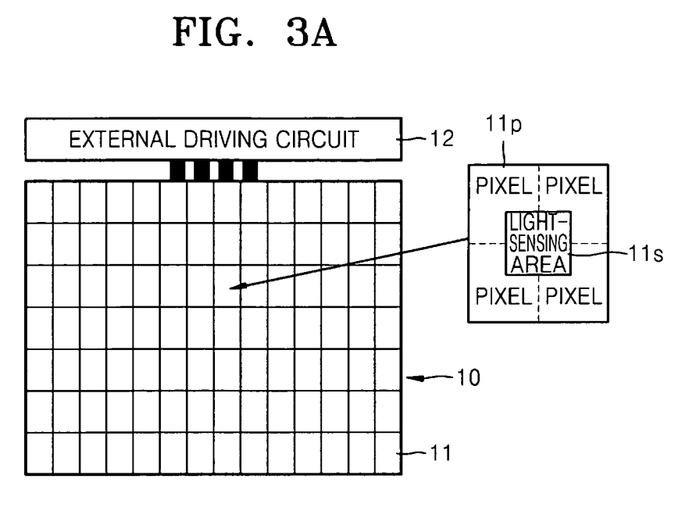
FIGS. 3A and 3B are schematic diagrams showing an optical touch panel in which a light-sensing area is formed on a surface of a display panel, according to example embodiments.
Figure 3B:
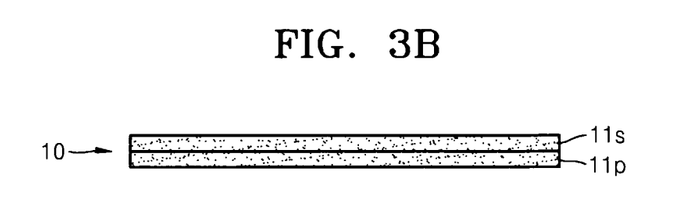

In addition, FIGS. 3A and 3B schematically show an example in which light-sensing area 11s may be formed on a surface(s) of display panel 10 for realizing the optical touch panel. Referring to FIGS. 3A and 3B, the optical touch panel may include display panel 10. Display panel 10 may include pixel array 11, having a plurality of pixels, external driving circuit 12 adapted to drive pixels 11, and/or light-sensing areas 11s disposed on the surface(s) of display panel 10. As shown in FIG. 3A, light-sensing areas 11s may be formed on pixels 11p. Each of light-sensing areas 11s may be disposed on a boundary between pixels 11p. In example embodiments, pixels 11p and light-sensing areas 11s may match each other in one-to-one correspondence. However, example embodiments are not limited thereto. One light-sensing area 11s may be disposed, for example, at every two or more pixels 11p according to a selection by the designer.

In FIGS. 3A and 3B, light-sensing areas 11s may be integrally formed with display panel 10. For example, after forming pixels 11p in display panel 10, a transparent substrate (not shown) may be formed on pixels 11p and, then, light-sensing areas 11s may be formed on the transparent substrate. However, light-sensing areas 11s may be separately formed from display panel 10. For example, after separately forming display panel 10 and light-sensing areas 11s, light-sensing areas 11s may be attached to surfaces of display panel 10.

Figure 4:
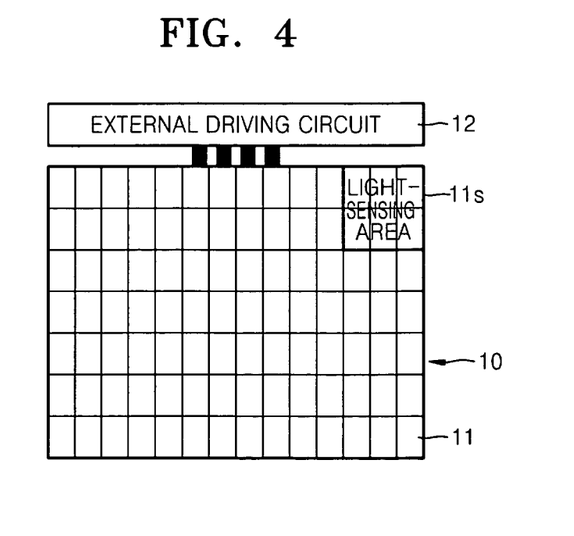
FIG. 4 is a schematic diagram of an optical touch panel in which a light-sensing area is partially formed on a part of the display panel, according to example embodiments.

In the above description, light-sensing areas 11s may be disposed entirely on display panel 10. However, example embodiments are not limited thereto. As shown in FIG. 4, light-sensing areas 11s may be disposed on a part of display panel 10. FIG. 4 shows an example in which light-sensing areas 11s may be disposed on an upper right portion of display panel 10. Light-sensing areas 11s shown in FIG. 4 may be formed in the same way as those of light-sensing areas 11s shown in FIGS. 2A through 2C and/or FIGS. 3A and 3B, except that light-sensing areas 11s of FIG. 4 may be disposed on only a part or parts of display panel 10. That is, light-sensing areas 11s of FIG. 4 may be formed together with pixels 1ip in display panel 10, or may be formed on the surface(s) of display panel 10.

Figure 5:
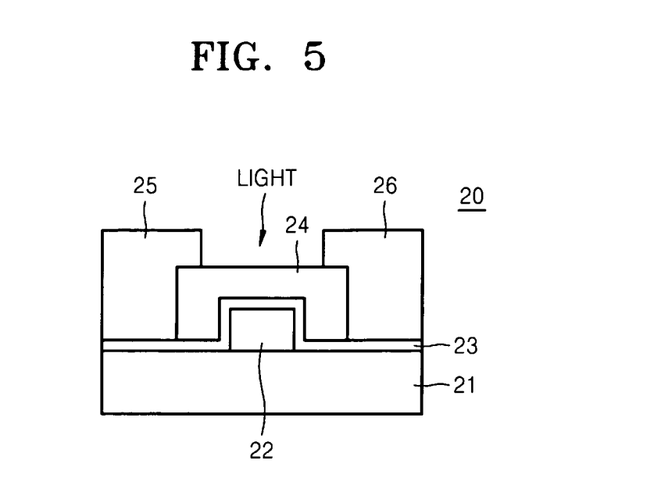
FIG. 5 is a cross-sectional view of a light-sensitive transparent oxide transistor according to example embodiments.

Each of light-sensing areas 11s may include a device with an output signal that varies depending on the intensity of incident light. In addition, the device of light-sensing area 11s may be formed of a material that is sufficiently transparent so as not to affect the images displayed on display panel 10. The device of light-sensing area 11s may be a light-sensitive transparent oxide transistor. The light-sensitive transparent oxide transistor may be a transistor using a transparent oxide semiconductor that is sensitive to light as a channel material and, thus, a threshold voltage of the light-sensitive transparent oxide transistor may vary depending on a wavelength and/or intensity of the incident light. FIG. 5 is a cross-sectional view of light-sensitive transparent oxide transistor 20 according to example embodiments.

Referring to FIG. 5, light-sensitive transparent oxide transistor 20 may include transparent substrate 21, gate electrode 22 partially formed on transparent substrate 21, gate insulating layer 23 covering transparent substrate 21 and/or gate electrode 22, oxide semiconductor layer 24 partially covering gate insulating layer 23, and/or source electrode 25 and/or drain electrode 26 respectively formed on opposite sides of oxide semiconductor layer 24. Gate electrode 22, source electrode 25, and/or drain electrode 26 may be formed of transparent conductive material, for example, indium tin oxide (ITO), indium zinc oxide (IZO), and/or aluminum-doped zinc oxide (AZO). In addition, gate insulating layer 23 may be formed of transparent insulating material such as $SiO_2$. Oxide semiconductor layer 24, functioning as a channel region, may be formed of light-sensitive transparent oxide material, for example, a ZnO-based material and/or an oxide semiconductor, in which one or more of indium (In), gallium (Ga), and hafnium (Hf) may be mixed with ZnO, for example, InZnO and/or gallium indium zinc oxide (GIZO).

Figure 6A:
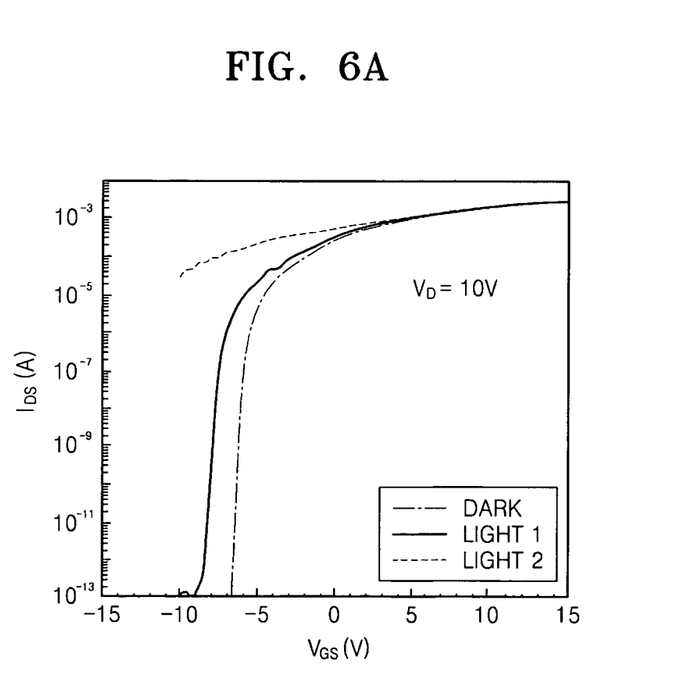
FIGS. 6A and 6B are graphs illustrating operating characteristics of the light-sensitive transparent oxide transistor shown in FIG. 5.
Figure 6B:
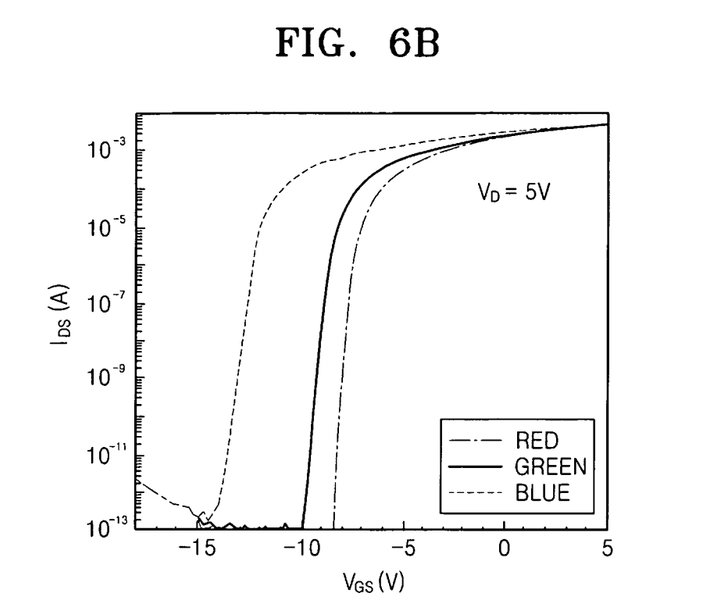

FIGS. 6A and 6B are graphs illustrating operation characteristics of light-sensitive transparent oxide transistor 20 shown in FIG. 5, in particular, when InZnO is used as the material forming oxide semiconductor layer 24. In FIGS. 6A and 6B, $V_D$ is a drain voltage applied to the drain electrode 26 of the light-sensitive transparent oxide transistor 20. Referring to FIG. 6A, as the intensity of the incident light may increase, the threshold voltage may be reduced and/or an output current $I_{DS}$ with respect to constant gate voltage $V_{GS}$ may increase. Referring to FIG. 6B, as the wavelength of the incident light may be reduced, the threshold voltage may be reduced and/or the output current $I_{DS}$ with respect to constant gate voltage $V_{GS}$ may be increased.

Therefore, light-sensitive transparent oxide transistor 20 shown in FIG. 5 may be used as a light sensor in light-sensing area 11s, and/or a general transistor (or transparent oxide transistor), which is not sensitive to the light, may be used as the TFT for controlling pixels 11p and/or the TFT for reading the signals from light-sensing area 11s. As such, the above-described optical touch panel may be fabricated.

Figure 7:
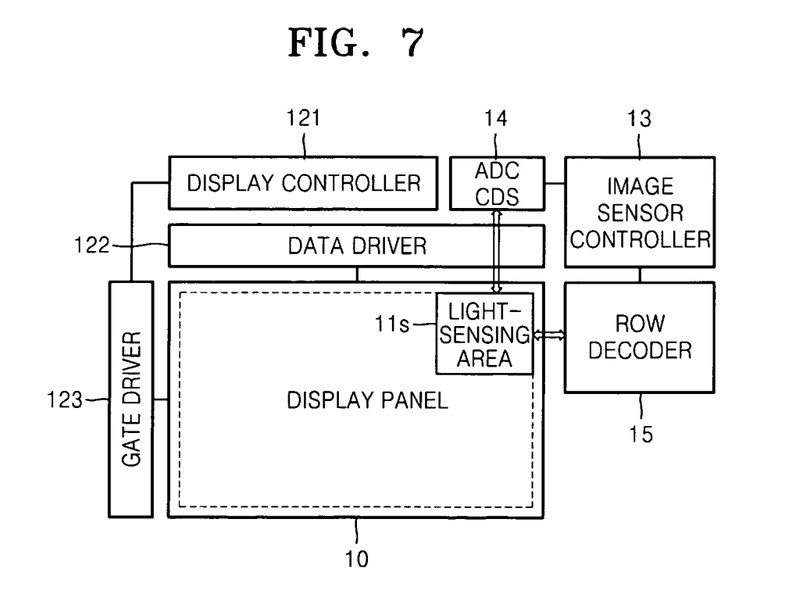
FIG. 7 is a block diagram of an optical touch panel including a display panel, according to example embodiments.

FIG. 7 is a block diagram schematically showing a driving structure of the optical touch panel including display panel 10, according to example embodiments. Referring to FIG. 7, the optical touch panel may include display panel 10, display controller 121 adapted to control driving of the display panel 10, data driver 122, and/or gate driver 123. In addition, the optical touch panel may further include light-sensing areas 11s formed on display panel 10, image sensor controller 13 adapted to read signals from light-sensing areas 11s, analog/digital (A/D) converter 14, and/or row decoder 15.

An image forming operation of display panel 10 may be controlled by display controller 121. For example, display controller 121 may respectively provide data driver 122 and/or gate driver 123 with control signals according to image information that is to be displayed. Data driver 122 and/or gate driver 123 may turn on/off certain pixel 11p in display panel 10 using the TFT (not shown) of display panel 10 according to the control signals. The driving of display panel 10 may be performed in a way that is known to a person having ordinary skill in the art and, thus, detailed descriptions thereof are not provided here.

Driving of light-sensing areas 11s will be described as follows. Row decoder 15 may send a reading control signal to light-sensing areas 11s according to the control of image sensor controller 13. Then, a light intensity signal from light-sensing areas 11s may be input to A/D converter 14, and/or the light intensity signal may be converted into a digital signal by A/D converter 14. In A/D converter 14, a correlated double sampling (CDS) circuit may be further installed in order to remove thermal noise and/or fixed pattern noise included in the light intensity signals transmitted from light-sensing areas 11s. A/D converter 14 may transmit the digital signal to image sensor controller 13. Image sensor controller 13 may generate information representing whether the light is incident on the touch panel or coordinates of a light incident point according to the received digital signal. Image sensor controller 13 may provide an input/output apparatus of, for example, a computer system (not shown) with the generated information.

Figure 8A:
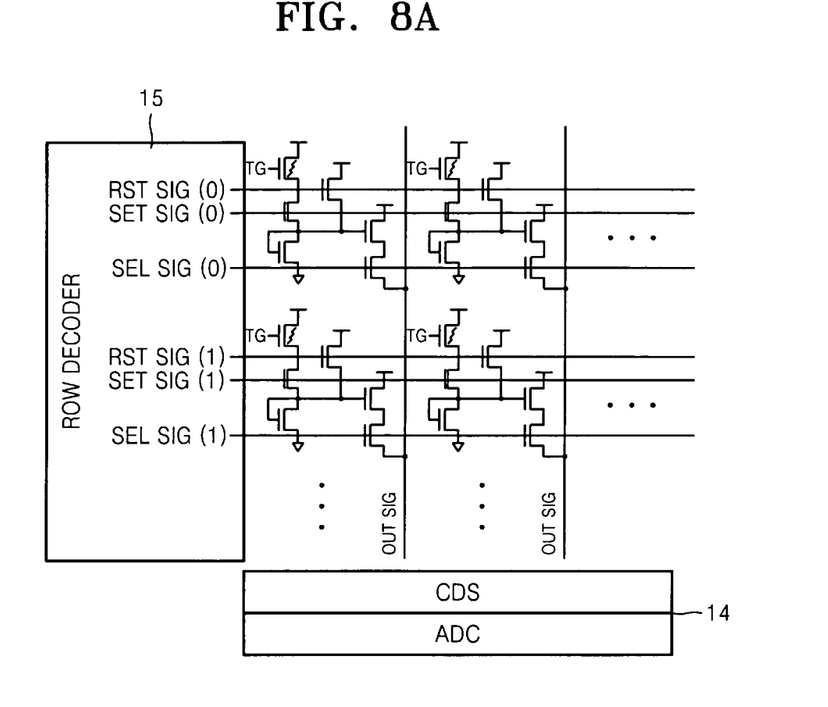
FIGS. 8A through 8C are schematic diagrams showing examples of a light sensing circuit for reading data from a light-sensing area including a light-sensitive transparent oxide transistor, according to example embodiments.
Figure 8B:
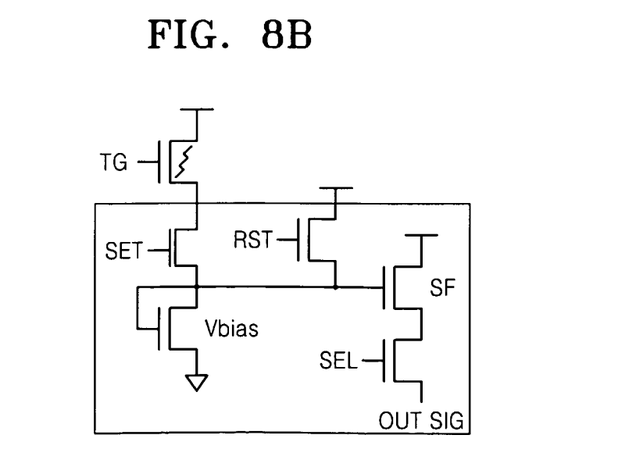

FIGS. 8A and 8B schematically show a light sensing circuit for reading data from light-sensing area 11s including light-sensitive transparent oxide transistor TG, according to example embodiments. In FIG. 8A, light-sensitive transparent oxide transistor TG may be disposed on light-sensing area 11s. In addition, other transistors that are connected to light-sensitive transparent oxide transistor TG may be TFTs formed on a substrate (not shown) under light-sensing area 11s, and/or may configure the light sensing circuit for outputting the light intensity signal from light-sensitive transparent oxide transistor TG to A/D converter 14 according to the control signal of row decoder 15. As described above, the light sensing circuit may be disposed together with the TFT layer for controlling pixels 11p on the substrate of display panel 10.

As shown in FIG. 8A, row decoder 15 may provide the light sensing circuit with a set signal (SET SIG), a reset signal (RST SIG), and a selection signal (SEL SIG) as the reading control signals according to the control of image sensor controller 13. In addition, the light sensing circuit may provide A/D converter 14 with the output signal (OUT SIG). A/D converter 14 may further include the CDS circuit. Therefore, noise included in the signal provided from the light sensing circuit may be removed by the CDS circuit first, and then, the signal from which the noise is removed is converted into the digital signal.

FIG. 8B is an enlarged view of the light sensing circuit shown in FIG. 8A. Referring to FIG. 8B, light-sensitive transparent oxide transistor TG, a set transistor (SET), and/or a bias transistor (Vbias) may be connected to each other in series. For example, an output of set transistor SET may be connected to a gate of bias transistor Vbias. A bias voltage (Vb) may be applied to a drain of bias transistor Vbias. In addition, an output of set transistor SET may also be connected to a source of reset transistor RST and/or a gate of source follower transistor (SF). Input voltage Vdd may be applied to drains of source follower transistor SF and/or reset transistor RST. Selection transistor SEL may be connected to a source of source follower transistor SF.

Figure 8C:
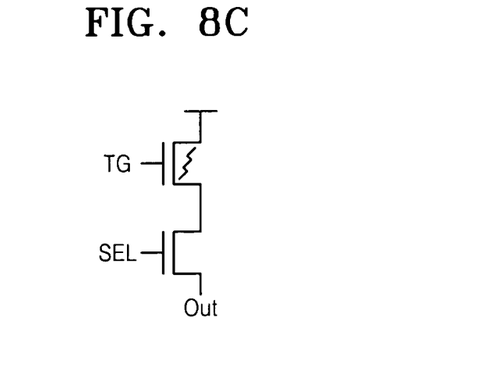

Set transistor SET and/or reset transistor RST may initialize the voltage applied to the gate of source follower transistor SF, and/or bias transistor Vbias may bias the output signal, and thus, the noise may be efficiently compensated. In addition, since source follower transistor SF may function as an amplifier, a light detecting sensitivity of light-sensitive transparent oxide transistor TG may be increased. However, the light sensing circuit is not limited to the configuration shown in FIGS. 8A and 8B. For example, the light sensing circuit may be configured as shown in FIG. 8C, where selection transistor SEL may be solely connected to the drain of light-sensitive transparent oxide transistor TG. In general, in order to reduce noise and/or increase sensitivity, a lot of transistors may be required, and accordingly, the circuit becomes complex. Therefore, the complex circuit may be integrated in a limited area and, thus, fabrication costs may be incurred. Thus, one of ordinary skill in the art may design an appropriate light sensing circuit in consideration of light sensing effects versus fabrication costs.

Hereinafter, a method of recognizing and processing an optical input to the optical touch panel having the above-described structure will be described in detail.

Figure 9A:
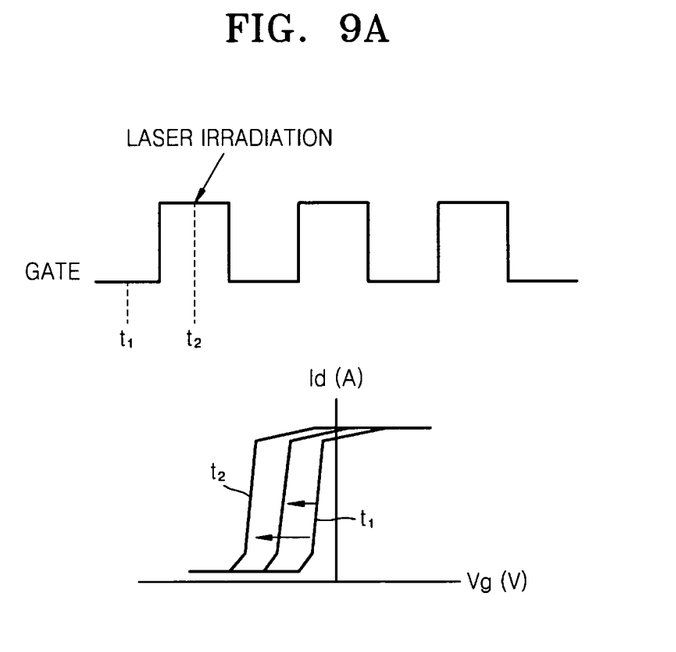
FIGS. 9A and 9B are diagrams illustrating a light sensing method for recognizing an optical input to the optical touch panel, according to example embodiments.

FIG. 9A illustrates an example of light sensing method for recognizing an optical input to the optical touch panel, for example, a method of recognizing the optical input from a difference between light intensities before and after irradiating a laser beam onto the optical touch panel. Referring to FIG. 9A, input pulses may be regularly input to a gate of light-sensitive transparent oxide transistor TG disposed on light-sensing area 11s. The input pulses may be, for example, clock pulses used in display panel 10. Whenever a pulse is input to the gate of light-sensitive transparent oxide transistor TG, an electrical output corresponding to the intensity of the light incident to light-sensitive transparent oxide transistor TG may be generated.

If, after time $t_1$ has elapsed, a laser beam may be incident to light-sensitive transparent oxide transistor TG at time $t_2$, the output current $I_D$ of light-sensitive transparent oxide transistor TG versus gate voltage Vg may be changed as shown in lower graph of FIG. 9A. Therefore, a change in the output between time $t_1$ and time $t_2$ may be sensed and, then, when the change may be greater than or equal to a reference value ΔVt (that may or may not be predetermined), image sensor controller 13 may determine that the optical input is incident to the optical touch panel. Reference value ΔVt may be set in advance through experiments. As described above, the optical input may be recognized from the change in the output according to the time elapse.

Figure 9B:
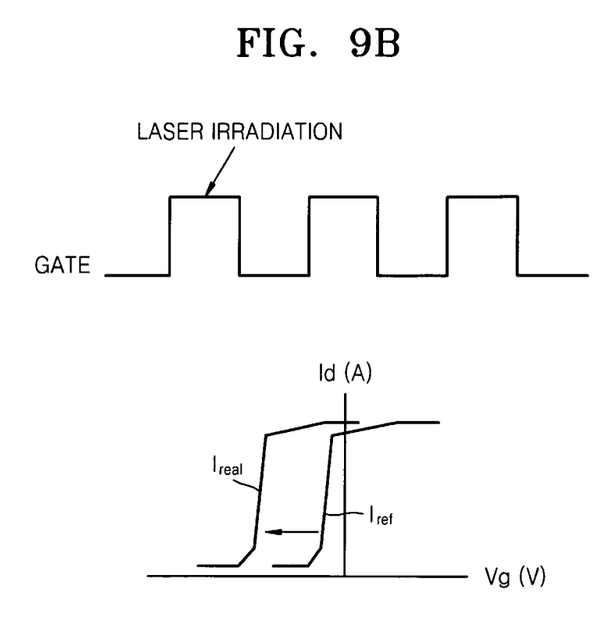

Light-sensing areas 11s may be disposed on pixels 11p and/or in pixels 11p. Therefore, while display panel 10 may display the images, the light may be incident to light-sensing area 11s from pixel 11p. In addition, the intensity of the light incident from pixel 11p may be continuously changed according to the image to be displayed on display panel 10. Considering this, information about the light intensity of the image displayed in a certain pixel 11p at a certain time may be input in image sensor controller 13 in advance, and then, the optical input may be recognized from the difference between the input light intensity information and the light intensity that is actually measured. FIG. 9B illustrates the method described above.

Referring to FIG. 9B, the input pulses may be regularly input to the gate of light-sensitive transparent oxide transistor TG in light-sensing areas 11s. Image sensor controller 13 may receive the light intensity information expected in a certain pixel 11p during the pulse time. The light intensity information may be transmitted from, for example, display controller 121 that may include the information about the image to be displayed on display panel 10. That is, display controller 121 may control display panel 10 according to the information about the image to be displayed and, at the same time, may transmit the image information to image sensor controller 13. For example, display controller 121 may convert the image information to the light intensity information before transferring the image information to image sensor controller 13. Display controller 121 may transfer the image information itself to image sensor controller 13. In this case, image sensor controller 13 may calculate the light intensity information from the transferred image information. When predicting the light intensity information, the light intensity of pixel 11p corresponding to light-sensing area 11s may only be considered, however, the light intensity may be predicted from an average of the light intensities of a plurality of pixels 11p surrounding one light-sensing area 11s.

After that, the actual light intensity may be calculated from the output from light-sensitive transparent oxide transistor TG. If actually measured light intensity $I_{real}$ is greater than predicted light intensity $I_{ref}$ by a reference value $\Delta I_{max}$ (that may or may not be predetermined) or greater, image sensor controller 13 may determine that the optical input is incident to the optical touch panel. Reference value $\Delta I_{max}$ may be set through experiments. In the above way, the optical input is recognized from the difference between the light intensity input from display controller 121 and the actually measured light intensity.

One of the above two light sensing methods for recognizing the optical input incident to the optical touch panel may be selectively used. However, example embodiments are not limited thereto, and both of the two methods above may be used together. For example, the optical input may be sensed by using the two methods above, and when the optical input is sensed by one of the two methods above, image sensor controller 13 may determine that the optical input is incident to the optical touch panel. On the other hand, image sensor controller 13 may determine that the optical input is incident to the optical touch panel only when the optical input is sensed by both of the two methods.

Figure 10A:
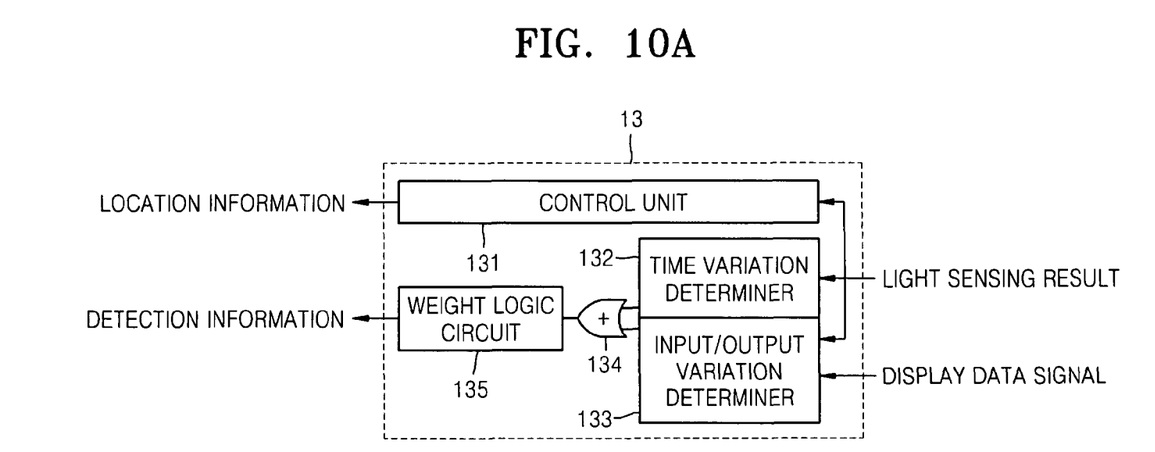
FIGS. 10A and 10B are block diagrams showing examples of an image sensor controller according to example embodiments.
Figure 10B:
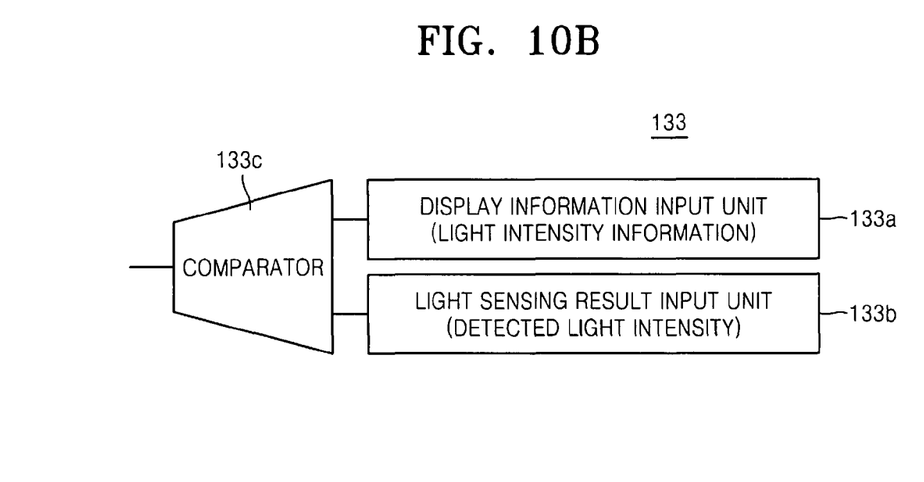

FIGS. 10A and 10B are block diagrams of examples of image sensor controller 13 for executing the above-described operations, according to example embodiments. Referring to FIG. 10A, image sensor controller 13 may include control unit 131, time variation determiner 132, input/output variation determiner 133, logic sum circuit 134, and/or weight logic circuit 135. The light sensing result of light-sensing area 11s may be input to control unit 131, time variation determiner 132, and/or input/output variation determiner 133 via A/D converter 14.

Control unit 131 may calculate information about locations of plurality of light-sensing areas 11s and the light intensity information of light-sensing areas 11s. Time variation determiner 132 may determine whether the optical input is incident to the optical touch panel according to the optical input sensing method described with reference to FIG. 9A. That is, time variation determiner 132 may determine the optical input from the change in the output of light-sensitive transparent oxide transistor TG with time intervals (that may or may not be predetermined) according to the input pulses, and/or may output the determination result. Input/output variation determiner 133 may determine whether the optical input is incident to the optical touch panel according to the optical input sensing method described with reference to FIG. 9B. That is, input/output variation determiner 133 may determine whether the optical input is incident to the optical touch panel from the difference between the value input from display controller 121 and the actually measured value, and/or may output the determination result.

FIG. 10B shows input/output variation determiner 133 in more detail. Referring to FIG. 10B, input/output variation determiner 133 may include display information input unit 133a, light sensing result input unit 133b, and/or comparator 133c. Display information input unit 133a may receive the image information from display controller 121. In addition, display information input unit 133a may calculate the light intensity information from the received image information, if necessary. Light sensing result input unit 133b may receive the light sensing result from A/D converter 14. Comparator 133c may compare outputs of display information input unit 133a and light sensing result input unit 133b. That is, comparator 133c may determine whether actually measured light intensity $I_{real}$ from light sensing result input unit 133b is greater than predicted light intensity $I_{ref}$ from display information input unit 133a by a reference value $\Delta I_{max}$ (that may or may not be predetermined) or greater, and/or may output the determination result.

Referring to FIG. 10A again, logic sum circuit 134 may be an OR gate for calculating a logic sum calculation by receiving the output signals from time variation determiner 132 and/or input/output variation determiner 133. For example, if one of time variation determiner 132 and input/output variation determiner 133 determines the optical input, logic sum circuit 134 may output a signal indicating that there is an optical input. However, in example embodiments, a logical multiplier circuit (AND gate) may be used instead of logic sum circuit 134. In this case, when both of time variation determiner 132 and input/output variation determiner 133 determine that there are optical inputs, the logical multiply circuit may output a signal indicating that there is an optical input. The optical input signal from logic sum circuit 134 may be input to weight logic circuit 135 and/or control unit 131.

On the other hand, various methods of generating the selection signal, that is, a click signal from the mouse or the touch signal on the touch panel will be described as follows.

First, the selection signal may be generated from the time for the laser beam incident on a certain light-sensing area 11s. For example, weight logic circuit 135 receiving the optical input signal, for example, via logic sum circuit 134 may count the time of maintaining the optical input. If the optical input to a certain light-sensing area 11s is maintained during a reference time (that may or may not be predetermined), weight logic circuit 135 may generate the selection signal. If the reference time is not exceeded while maintaining the optical input, weight logic circuit 135 may output the optical input signal simply. For example, if the reference time is set as 7 pulses, weight logic circuit 135 may count the input pulses on receiving the optical input signal from logic sum circuit 134, and/or may generate the selection signal when the input pulses exceeds 7 pulses. When the input pulses do not exceed 7 pulses, weight logic circuit 135 may output the optical input signal.

As another method, the selection signal may be generated by instantaneously changing the wavelength or intensity of the laser beam. For example, when the wavelength is changed, the output of light-sensitive transparent oxide transistor 20 may be changed as described with reference to FIG. 6B. To this end, time variation determiner 132 may generate the selection signal when the measured light intensity is changed within a range $\Delta Vt'$ (that may or may not be predetermined) after determining that there is an optical input. The selection signal from time variation determiner 132 may be output via logic sum circuit 134 and/or weight logic circuit 135. For example, light intensity changing range $\Delta Vt'$ for generating the selection signal may be smaller than the above-described reference $\Delta Vt$ for determining whether there is the optical input initially. For example, if the output from the light-sensitive transparent oxide transistor becomes lower than the level before irradiating the laser beam, the selection signal may not be generated, and/or the optical input may be cancelled.

As another method, the selection signal may be generated by recognizing motion of the laser beam. For example, if the laser beam may circulate within a certain area range on the optical touch panel or reciprocates between two points, control unit 131 may generate the selection signal. As described above, control unit 131 may include location information of plurality of light-sensing areas 11s, and/or may receive the optical input signal from logic sum circuit 134. Therefore, control unit 131 may sense the location variation of light-sensing area 11s, in which the optical input is generated. Control unit 131 may sense the change in the location of light-sensing area 11s in which there is the optical input, and/or may generate the selection signal if the location of light-sensing area 11s is changed in a certain pattern within the range (that may or may not be predetermined), for example, when the laser beam circulates within a certain area range of the optical touch panel or reciprocates between two points.

While example embodiments have been particularly shown and described, it will be understood by those of ordinary skill in the art that various changes in form and details may be made therein without departing from the spirit and scope of the present invention as defined by the following claims.

What is claimed is:

1. An optical touch panel, comprising:
   a plurality of light-sensing areas; and
   an image sensor controller configured to read signals from the light-sensing areas;
   wherein the plurality of light-sensing areas is integrally formed with pixels in a display panel or formed on the display panel, in order to sense incident light originating outside the optical touch panel, and
   wherein the image sensor controller is configured to:
      sense a change in an output from a specific light-sensing area between two time points;
      compare information on predicted light intensity of an image displayed on at least one pixel around a corresponding light-sensing area with information on light intensity actually measured in the corresponding light-sensing area; and
      determine that there is an optical input to the optical touch panel when the change in the output according to time is greater than or equal to a first reference value or when the measured light intensity is greater than the predicted light intensity of the image by a second reference value.

2. The optical touch panel of claim 1, wherein a plurality of pixels configured to form images and the plurality of light-sensing areas, disposed on sides of the plurality of pixels at a same layer as that of the pixels, are disposed in the display panel.

3. The optical touch panel of claim 1, wherein a red sub-pixel configured to emit red light, a green sub-pixel configured to emit green light, and a blue sub-pixel configured to emit blue light are associated with each of the light-sensing areas.

4. The optical touch panel of claim 1, wherein the light-sensing areas are integrally fabricated with the display panel on a surface of the display panel, or are fabricated separately from the display panel and attached on the surface of the display panel.

5. The optical touch panel of claim 1, wherein the plurality of light-sensing areas are disposed only on a part of the display panel.

6. The optical touch panel of claim 1, wherein a light-sensitive transparent oxide transistor is used as a light sensor in each of the light-sensing areas.

7. The optical touch panel of claim 6, wherein the light-sensitive transparent oxide transistor comprises:
   a gate electrode on a substrate;
   a gate insulating layer covering the substrate and the gate electrode;
   a light-sensitive transparent oxide semiconductor layer partially covering the gate insulating layer; and
   a source electrode and a drain electrode on opposite sides of the light-sensitive transparent oxide semiconductor layer.

8. The optical touch panel of claim 7, wherein the light-sensitive transparent oxide semiconductor layer uses a zinc oxide (ZnO)-based oxide semiconductor or an oxide semiconductor in which one or more of indium (In), gallium (Ga), and hafnium (Hf) is mixed in the ZnO.

9. The optical touch panel of claim 1, further comprising:
a row decoder configured to provide the light-sensing areas with reading control signals according to control of the image sensor controller; and
an analog/digital (A/D) converter configured to receive a light intensity signal from the light-sensing areas and configured to convert the light intensity signal to a digital signal.

10. The optical touch panel of claim 9, wherein the A/D converter comprises a correlated double sampling (CDS) circuit configured to remove noise included in the light intensity signal from the light-sensing areas.

11. The optical touch panel of claim 1, wherein the image sensor controller generates a selection signal when the optical input is maintained in the specific light-sensing area for a reference time.

12. The optical touch panel of claim 1, wherein the image sensor controller generates a selection signal when the measured light intensity, after the optical input is generated, is changed in a reference range.

13. The optical touch panel of claim 1, wherein the image sensor controller senses variation in location of the specific light-sensing area in which the optical input is incident, and generates a selection signal when the location of the specific light-sensing area is changed in a pattern.

14. An optical touch panel, comprising:
a plurality of light-sensing areas; and
an image sensor controller configured to read signals from the light-sensing areas;
wherein the plurality of light-sensing areas is integrally formed with pixels in a display panel or formed on the display panel, in order to sense incident light originating outside the optical touch panel, and
wherein the image sensor controller comprises:
a control unit configured to calculate location information of the light-sensing areas and intensity information in the light-sensing areas;
a time variation determiner configured to determine whether the change in the output from the light sensing areas according to time is greater than or equal to a first reference value;
an input/output variation determiner configured to determine whether the light intensity measured in the light-sensing areas is greater than the predicted light intensity of the image by a second reference value;
a logic sum circuit configured to calculate a logic sum of an output from the time variation determiner and an output from the input/output variation determiner; and
a weight logic circuit configured to count a time of maintaining an optical input to the optical touch panel.

15. A method of driving an optical touch panel, the optical touch panel comprising a plurality of light-sensing areas and an image sensor controller configured to read signals from the light-sensing areas, wherein the light-sensing areas are integrally formed with pixels in a display panel or formed on a surface of the display panel, in order to sense incident light originating outside the optical touch panel, the method comprising:
sensing a change in an output from the plurality of light-sensing areas between two time points;
comparing information on predicted light intensity of an image displayed on at least one pixel around a corresponding light-sensing area with information on light intensity actually measured in the corresponding light-sensing area; and
determining that there is an optical input when the change in the output is greater than or equal to a first reference value or when the measured light intensity is greater than the predicted light intensity by a second reference value.

16. The method of claim 15, wherein the information on the predicted light intensity of the image displayed on the at least one pixel around the corresponding light-sensing area is provided from a display controller for controlling the display panel.

17. The method of claim 15, further comprising:
generating a selection signal when the optical input to a specific light-sensing area is maintained for a reference time.

18. The method of claim 15, further comprising:
generating a selection signal when the measured light intensity, after the optical input is generated, is changed in a reference range.

19. The method of claim 15, further comprising:
generating a selection signal when variation in location of a specific light-sensing area in which the optical input is incident is sensed and the location of the specific light-sensing area is changed in a pattern.

* * * * *